No. 735,445. PATENTED AUG. 4, 1903.
G. BANKS.
HOOK.
APPLICATION FILED NOV. 20, 1902.
NO MODEL.

WITNESSES: INVENTOR
George Banks,
BY A. S. Pattison,
Attorney

No. 735,445.

Patented August 4, 1903.

UNITED STATES PATENT OFFICE.

GEORGE BANKS, OF GREENVILLE, MICHIGAN, ASSIGNOR OF ONE-HALF TO FRANK A. LAMB, OF GREENVILLE, MICHIGAN.

HOOK.

SPECIFICATION forming part of Letters Patent No. 735,445, dated August 4, 1903.

Application filed November 20, 1902. Serial No. 132,130. (No model.)

*To all whom it may concern:*

Be it known that I, GEORGE BANKS, a citizen of the United States, residing at Greenville, in the county of Montcalm and State of Michigan, have invented new and useful Improvements in Hooks, of which the following is a specification.

My invention relates to improvements in hooks, and pertains more particularly to that class of hooks used on harness, whiffletrees, &c.

The object of my invention is to provide a hook which will take the place of the snap-hook and to provide a hook which is adapted to receive a ring or loop and after said ring or loop is properly inserted cannot be removed by any backward or upward pressure thereon.

Another object of my invention is to provide a hook of the character which is cheaper, more simple, and more effective in operation than any that has heretofore been produced.

Figure 1:
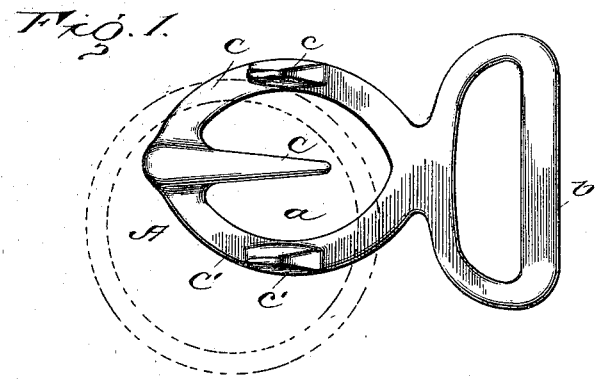
Figure 2:
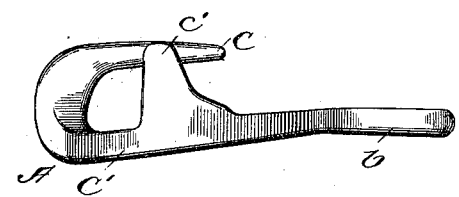
Figure 3:
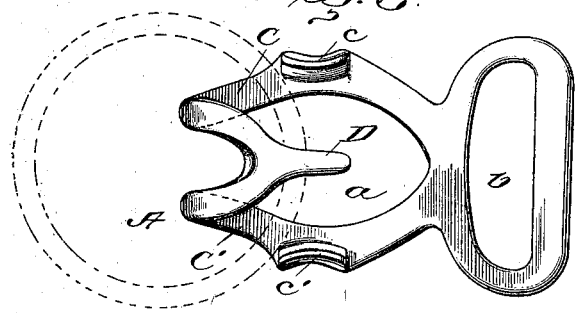
Figure 4:
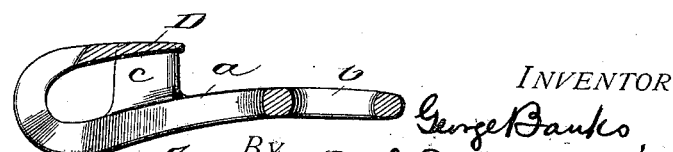

In the accompanying drawings, Figure 1 is a top plan view of my hook, showing a ring in dotted lines in the act of being inserted. Fig. 2 is a side view. Fig. 3 is a top plan view of a modification showing the ring in dotted lines after inserted. Fig. 4 is a vertical sectional view of the modification.

Referring now to the drawings, A represents the body portion of my hook, which is provided at its rear end with a loop $b$, which is formed in said body portion and can be round or oval, but is preferably made in the form shown in the drawings. By this loop it is understood that the hook is secured to the device on which it is to be used and may be secured in any desired manner. The said body portion is provided at its opposite end with an upwardly and rearwardly extending hook C, which is gradually tapered toward the end and is slightly inclined downwardly from the upwardly-extending forward portion, the purpose of which will be hereinafter fully described. The central portion of said body portion is cut out at $a$, and thus it will be seen that the upwardly and a portion of the rearwardly extending portion of the hook proper is of a skeleton work, and thus forms two parallel side walls C and C'. The said walls are provided with the upwardly-extending studs $c$ and $c'$, which extend up even with the upper edge of the rearwardly-extending hook C. The side of said upwardly-extending studs or ears $c$ and $c'$ have their outer vertical walls slightly concaved for the purpose of making the hook lighter.

It will be clearly seen that the rearwardly-extending hook C extends beyond and below the studs $c$ and $c'$, and after the rings or loops have been inserted therein it is impossible to remove the same by any backward or upward pressure thereon.

In the modification shown in Figs. 3 and 4 I simply cut away the central portion of the body portion A and reduce the outer upwardly and rearwardly extending portion D, and thus make a narrow hook portion; but said hook portion D is slightly downwardly extended between the studs or ears $c$ and $c'$ for the purpose heretofore mentioned.

The operation of inserting the ring or loop in the hook is as follows: The ring is held obliquely in the hand, is inserted between one of the studs and the base of the rearwardly-extending hook proper, and is drawn forward, so that the opposite side passes under the hook and over the stud carried by the opposite side, and is then drawn forward, and when brought into a horizontal position it will be clearly seen that it cannot be removed by any direct backward or upward pressure, but has to be twisted and removed as inserted.

Having thus described my invention, what I claim, and desire to secure by Letters Patent, is—

A hook of the character described, comprising a broad oval body portion having a central oval longitudinally-extending cut-away portion forming a longitudinal web at each side, upwardly-extending inwardly-curved oppositely-disposed studs carried by the longitudinal webs intermediate their ends, a transverse elongated attaching-eye carried by one end of said body portion, and an upwardly rearwardly and slightly downwardly extending hook carried by the opposite end of said body portion and extending between the upwardly-extending studs and a distance beyond the rear wall thereof.

In testimony whereof I have hereunto set my hand in the presence of two subscribing witnesses.

GEORGE BANKS.

Witnesses:
S. A. ROWLAND,
O. SHANMAN.